(12) United States Patent
Sullivan et al.

(10) Patent No.: US 8,532,812 B2
(45) Date of Patent: Sep. 10, 2013

(54) SYSTEM AND METHOD FOR IDENTIFYING DEFECTS OF SURFACES DUE TO MACHINING PROCESSES

(75) Inventors: Alan Sullivan, Middleton, MA (US); Arun R. Yoganandan, Chennai (IN)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 489 days.

(21) Appl. No.: 12/825,685

(22) Filed: Jun. 29, 2010

(65) Prior Publication Data

US 2011/0320023 A1 Dec. 29, 2011

(51) Int. Cl.
*G06F 19/00* (2011.01)

(52) U.S. Cl.
USPC .......................................... 700/184; 382/144

(58) Field of Classification Search
USPC .................. 700/184, 121; 382/144; 250/225
See application file for complete search history.

(56) References Cited

U.S. PATENT DOCUMENTS

| | | | | |
|---|---|---|---|---|
| 4,646,906 A | * | 3/1987 | Wilcox et al. | 198/303 |
| 5,689,332 A | * | 11/1997 | Ellingson et al. | 356/237.1 |
| 6,292,582 B1 | * | 9/2001 | Lin et al. | 382/149 |
| 6,297,503 B1 | * | 10/2001 | Bindell et al. | 250/307 |
| 6,781,688 B2 | * | 8/2004 | Kren et al. | 356/237.4 |
| 7,012,680 B2 | | 3/2006 | Kubo et al. | |
| 2003/0171840 A1 | | 9/2003 | Haupt | |
| 2004/0057610 A1 | * | 3/2004 | Filseth et al. | 382/144 |
| 2004/0066507 A1 | * | 4/2004 | Kren et al. | 356/237.4 |
| 2009/0268965 A1 | | 10/2009 | Mita | |

OTHER PUBLICATIONS

Jing et al., Data Processing Method od Surface Defect Detection on Sphere workpiece, 2007 ,Xi a university of Technology. p. 4-917-4-920.*
M.L Smith et al.: "Gradient Space Analysis of Surface Defects Using a Photometric Stereo Derived Bump Map" Image and Vision Computing, vol. 17, No. 3-4, Mar. 1, 1999, pp. 321-332.

* cited by examiner

*Primary Examiner* — Kidest Bahta
(74) *Attorney, Agent, or Firm* — Dirk Brinkman; Gene Vinokur (57) ABSTRACT

Embodiments of the invention disclose a method for determining defects of a surface of a model of an object generated from a model of an original object by a simulation of a machining process. The method determines orientations and rate of change in the orientation of the surface based on normal vectors to the surface and identifies the defects of the surface based on the rate of change and a threshold. The threshold is determined based on the machining process.

17 Claims, 8 Drawing Sheets

SYSTEM AND METHOD FOR IDENTIFYING DEFECTS OF SURFACES DUE TO MACHINING PROCESSES

FIELD OF THE INVENTION

The invention relates generally to a simulation of a machining process, and more particularly to identifying defects of a surface of an object from a model of the object rendered during the simulation.

BACKGROUND OF THE INVENTION

Numerically Controlled Machining

Simulation of the process of numerically controlled (NC) machining is of fundamental importance in computer aided design (CAD) and computer aided manufacturing (CAM). During the simulation, a computer model of a workpiece is edited with a computer representation of an NC machining tool and a set of NC machining tool motions to simulate the machining process. The workpiece model and tool representation can be visualized during the simulation to detect potential collisions between parts, such as the workpiece and the tool holder, and to verify the final shape of the workpiece after the simulation.

The final shape of the workpiece is affected by the selection of the tool and the tool motions. Instructions for controlling these motions are typically generated using a computer aided manufacturing (CAM) system from a graphical representation of the desired final shape of the workpiece. The motions are typically implemented using numerical control programming language, also known as preparatory code or G-Code, see the following standards RS274D and DIN 66025/ISO 6983.

The G-Code generated by the CAM system may not produce an exact replication of the desired shape. In addition, the movement of the NC tool is governed by motors of the NC machining system, which have limited speeds, ranges of motion, and abilities to accelerate and decelerate, so that the actual tool motions may not exactly follow the NC machining instructions.

Discrepancies between the actual final shape of the workpiece and the desired final shape of the workpiece can be very small, and difficult to see. In some situations, these discrepancies result in undesirable gouges or nicks in the surface of the final shape of the workpiece with sizes on the order of a few micrometers in depth and width, and tens of micrometers in length.

Typically, a set of NC machining instructions is tested by machining a test workpiece made of a softer, less expensive material prior to machining the desired part. If visual inspection of the test workpiece locates undesirable discrepancies in the test workpiece, then the NC machining instructions are modified accordingly.

However, this manual testing is time consuming and expensive. Time for machining a single test workpiece may be on the order of hours and several iterations may be required before an acceptable set of NC machining instructions is attained. Thus, it is desirable to test for these discrepancies using computer-based simulation and rendering. Examples of the computer-based simulation are described in U.S. patent application Ser. No. 12/495,588 and Ser. No. 12/468,607, incorporated herein by reference.

A particularly important application of NC machining is the fabrication of molds and dies. Molds and dies are produced in a relative low volume by NC machining for later use in high volume manufacturing. Thus, the defects in molds and dies can be undesirably transferred to the manufactured parts. Molds and dies are frequently used to form parts that have smooth, slowly varying "free-form" surfaces that have a high quality aerodynamic, tactile or aesthetic finish. For example, a modern tooth brush is cast from plastic using a mold and has a complex free-form shape that provides both aesthetic and tactile advantages. Likewise a die for stamping automobile body panels has a smooth free-form shape that can greatly affect aerodynamic drag and hence fuel economy, as well as the aesthetic appeal of the vehicle to consumers.

A die to stamp large parts that have a free-form shape can be very time consuming to produce due to both its size (1000's of millimeters) and because free-form surface are milled using relatively small tools (order of millimeters) requiring a large number of machining instructions (often millions). The same holds for an injection mold for plastic parts. The mold is typically large to enable the simultaneous production of many parts to improve manufacturing efficiency.

The NC machining simulator is capable of reproducing very small defects, e.g., 10s to 100s of microns, in very large simulated parts, e.g., 1000s of millimeters. The problem of locating these small defects is quite challenging. For example, a human operator must painstakingly explore the entire simulated mold at a fine scale, which is time consuming and prone to errors.

One method, determines the NC machining defects by analyzing the path of the machining tool. In particular, a vector is computed for a point on the path that is normal to the plane containing two vectors joining the point to the previous point and next point, respectively. The orientation of the normal vector relative to a side of the plane is determined by the sign of the curvature the path. For a smooth surface, the normal vector from consecutive points should be nearly parallel with the same sign of curvature. However, that method is limited only to defects caused by local variations in the tool path because that method only considers the relationship between consecutive points on the machining path, and does not consider defects caused by adjacent paths of the machining tools and/or adjacent regions on the surface.

Therefore, there is a need to identify defects of a surface of an object from a model of the object rendered during the simulation of NC machining process.

SUMMARY OF THE INVENTION

It is an object of the current invention to provide a method for identifying defects of a surface of an object from a model of the object.

It is further object of the invention to provide such method that highlights the defects to a user.

It is further object of the invention to provide such method that highlights the defects of the surface of the model of the object rendered during a simulation of a machining process.

It is a further object of this invention to provide such method that generates a list of possible defect areas on the simulated surface and presents this list to the user.

It is a further object of this invention to provide such method that reduces memory requirement without compromising a quality of defect identification.

Embodiments of the invention are based on the realization that the dependency of cusp angle on cut depth is reflected in an orientation of a surface of the object and/or a model of the object rendered during the simulation. Thus, the orientation of the surface, and, in particular, a rate of changes in the orientation, can be used to determine defects of the model of the object. For example, regions of the simulated surface that are less smooth can be identified and highlighted.

Embodiments of the invention determine defects of a surface of an object based on orientations and rate of change in the orientation of the surface. In various embodiments, the rate of change is determined based on normal vectors to the surface and the defects of the surface are identified based on the rate of change and a threshold.

For example, one embodiment discloses a method for determining a defect of a surface of an object due to a machining process applied to the object, wherein the surface is generated from a model of the object by a simulation of the machining process, comprising the steps of: determining, at each pixel of the model of the surface, orientations of the surface; determining, for each pixel of the model of the surface, a rate of change in the orientations of the surface; and comparing the rate of change to at least one threshold to identify the defects of the surface. The threshold is determined based on the machining process Another embodiment discloses a method for determining a defect of a surface of an object due to a machining process applied to the object, wherein the surface is generated from a model of the object by a simulation of the machining process, comprising the steps of: determining normal vectors at each pixel of the surface; determining, for each pixel of the surface, a rate of change in an orientation of the surface based on differences between a normal vector at a pixel and normal vectors at neighboring pixels, wherein defect of the surface is identified by a value of the rate of change; and highlighting the defect on a display.

Yet another embodiment discloses a system for determining a defect of a surface of a model of an object, comprising: means for generating the surface by a simulation of a machining process; means for determining, at each pixel of the model of the surface, orientations of the surface based on a normal vector at a pixel; means for determining, for each pixel of the model of the surface, a rate of change in the orientations of the surface; and means for comparing the rate of change to at least one threshold to identify the defects of the surface. The threshold is determined based on the machining process

DETAILED DESCRIPTION OF THE PREFERRED EMBODIMENT

Figure 1A:
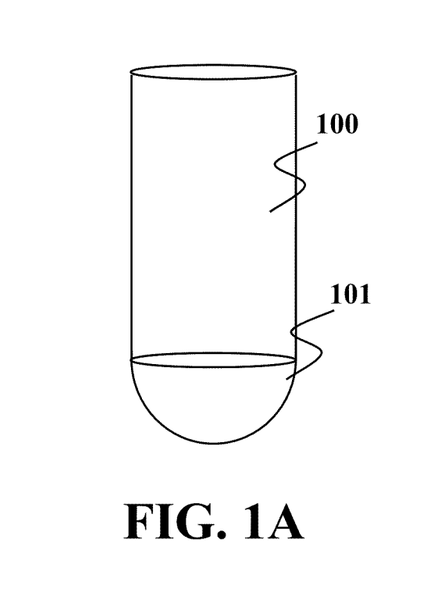
FIG. 1A shows a ball end milling cutter used to fabricate free-form surfaces during numerically controlled (NC) machining.

FIG. 1A shows a ball end milling cutter 100 commonly used to fabricate free-form surfaces during numerically controlled (NC) machining. In particular, a smooth hemispheric bottom 101 of a cutter 100 is capable of machining smooth surfaces.

Figure 1B:
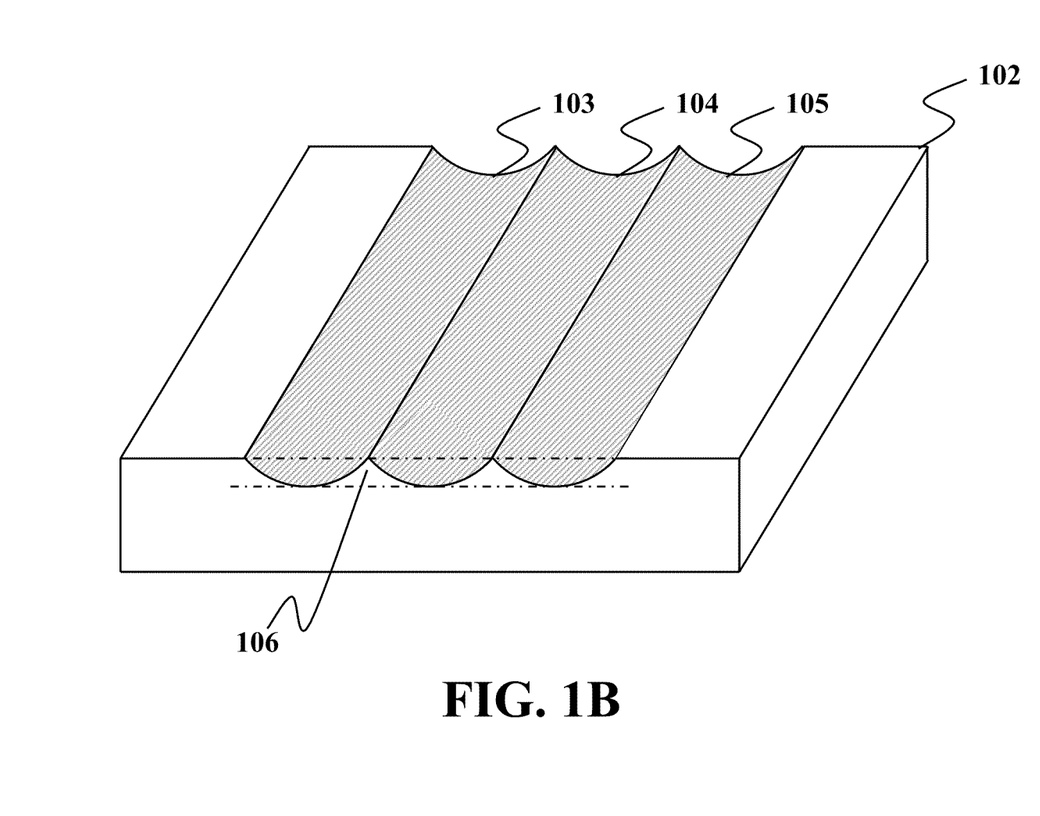
FIG. 1B shows an object milled by the ball end milling cutter of FIG. 1A.

FIG. 1B shows an object 102 milled by three linear cuts 103, 104 and 105 of the ball end milling cutter 100 producing semi-cylindrical surfaces. Between each of the cuts there is a triangular cusp formed by an intersection of each pair of cuts. For example between cuts 103 and 104 there is a cusp 106.

Figure 2:
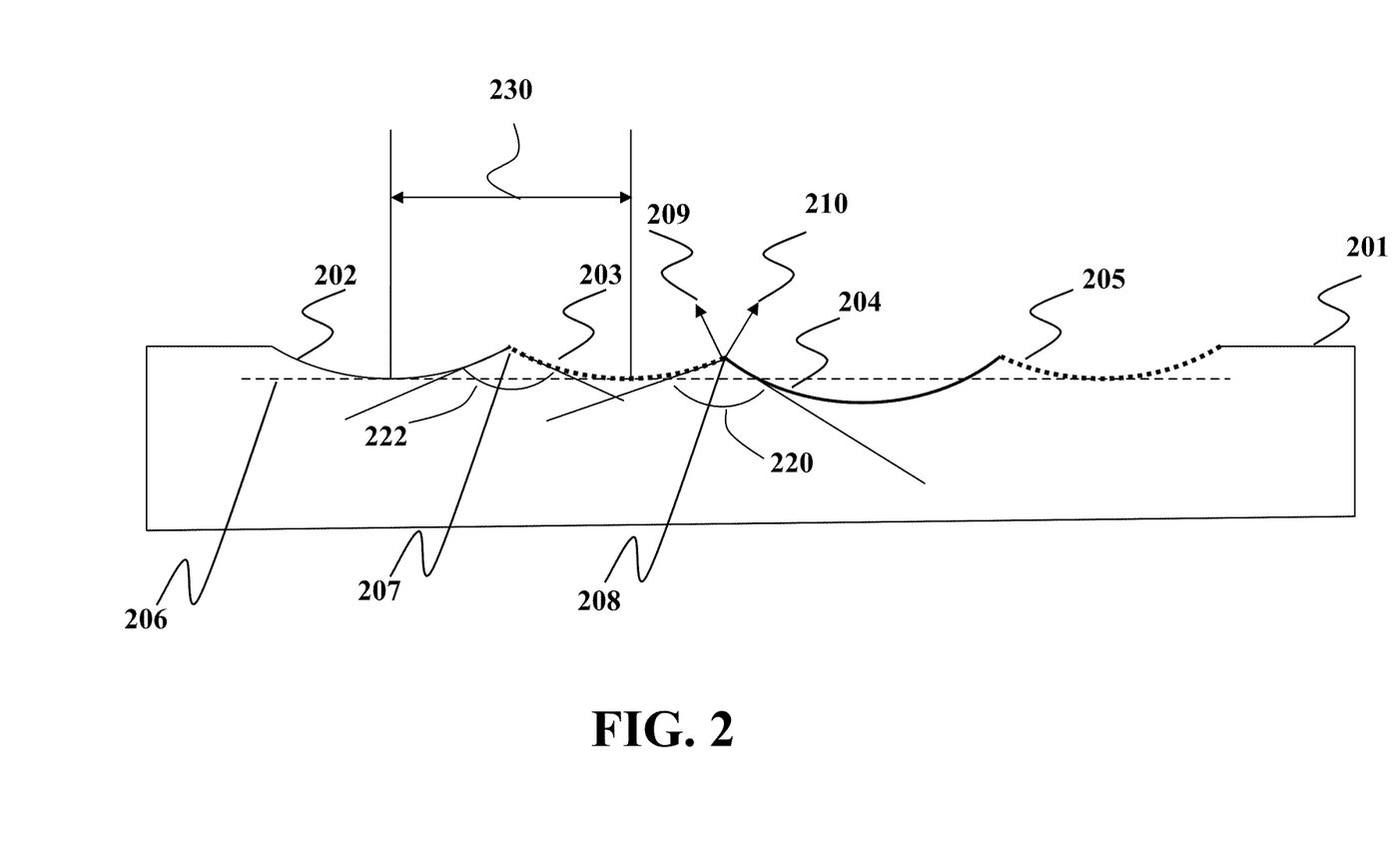
FIG. 2 is a side view of the object milled by the ball end milling cutter.

FIG. 2 is a side view of an object 201 milled by four cuts 202-205 of the ball end milling cutter. The cuts 202, 203 and 205 have an identical depth indicated by a dashed line 206. However, the cut 204 is deeper than the cuts 202, 203 and 205. Each pair of the cuts meets at the cusp. For example, the cut 202 and the cut 203 meet at the cusp 207 and the cut 203 and the cut 204 meet at the cusp 208. Because the cut 204 is deeper than the adjacent cuts, an angle 220 of cusp 208 is greater than an angle 222 of the cusp 207. A distance between adjacent cuts is a step over distance 230, typically determined by an operator of the CAM system during generation of the machining instructions.

Figure 3:
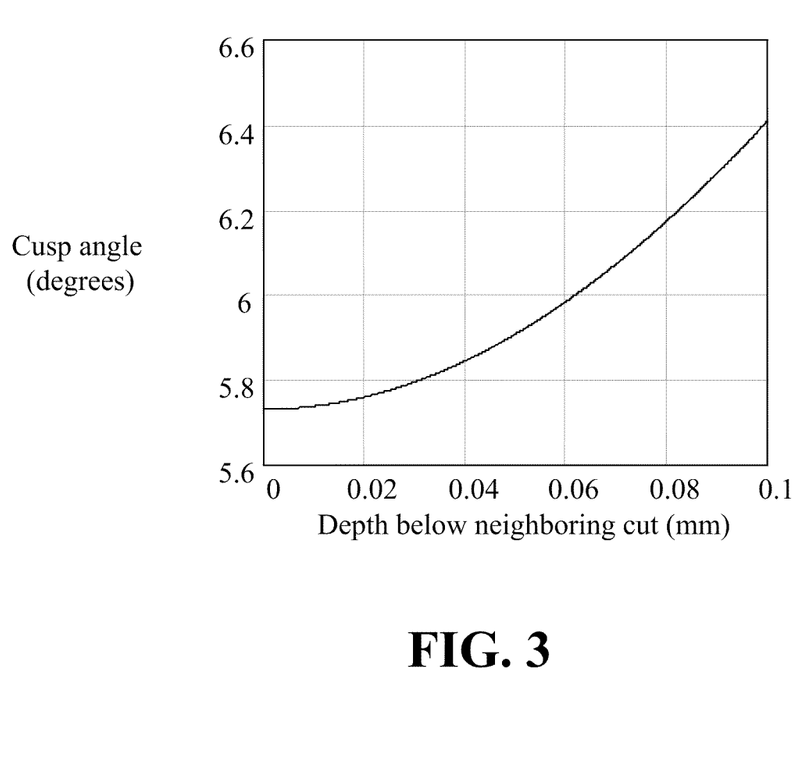
FIG. 3 is a graph of dependencies of cusp angle on a depth of the cut.

FIG. 3 shows dependency of the angle of cusps on the depth of the cut. In this example, the angle of cusps is determined between two cuts 0.2 mm apart, i.e., the tool moves in incremental distance steps of 0.2 mm, using a ball end mill cutting tool with a diameter of 4 mm. The angle increases with an increase of the depth of the cut.

Embodiments of the invention are based on the realization that the dependency of cusp angle on cut depth depends on an orientation of a surface of the object and/or a model of the object rendered during the simulation. Thus, the orientation of the surface, and, in particularly, a rate of changes in the orientation, can be used to determine defects of the model of the object. For example, regions of the simulated surface that are rougher can be identified and highlighted.

Figure 4:
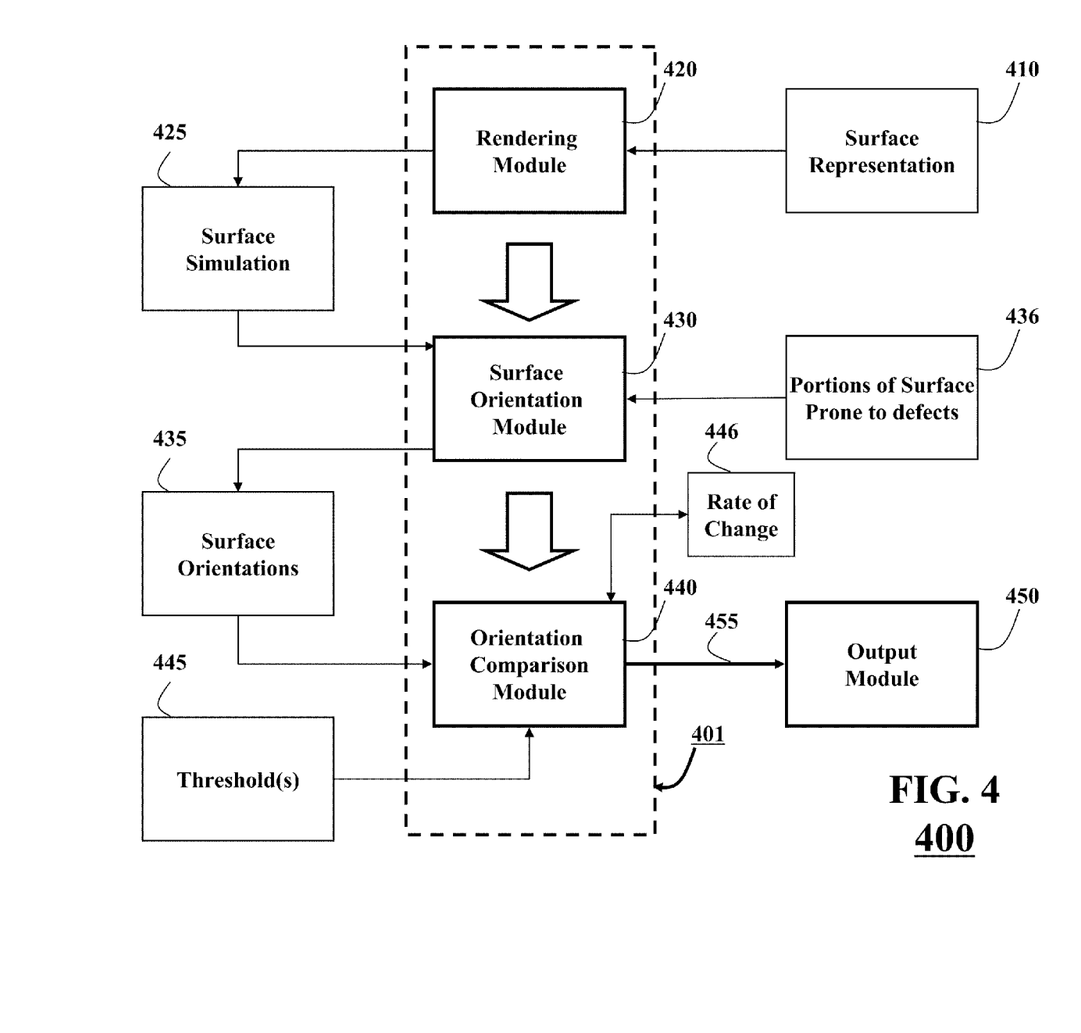
FIG. 4 is a block diagram of a method for determining defects of a surface of the object according to an embodiment of an invention.

FIG. 4 shows a block diagram of a method 400 for determining defects of the surface of the model of the object. In various embodiments of the invention, the surface is a whole surface of the object, a portion of the whole surface of the object, a visible surface from a particular point of view, regions of the object having high probability of defects, and/or combinations thereof. In one embodiment, the model of the object is produced from a model of original object based on a set of machining instruction. Steps of the method are performed by a processor 401, as known in the art.

The surface 425 of the model of the object is simulated by a rendering module 420 based on underlying representation 410 of the surface of the object. A surface orientation module 430 determines orientations 435 of the surface at each pixel of the surface.

An orientation comparison module 440 determines and compares a rate of change 446 in the orientations of the surface to one or more thresholds 445 to determine defects of the surface. One embodiment compares the rate of change to a minimal threshold, i.e., portions of the surface corresponding to the rate of change in the orientations of the surface with values above the minimum threshold are identified. Additionally or alternatively, another embodiment compares the rate of changes to a maximal threshold, i.e., portions of the surface corresponding to the rate of change in the orientations of the surface with the values below the maximal threshold are identified.

In various embodiments, the minimal and/or maximal thresholds are determined based on a shape of the original surface, a size of the tool, the machining instructions and/or a desired accuracy.

The minimal threshold facilitates differentiation between the cusps of the smooth regions over a majority of the surface of the simulated model of the object and the actual defects of the surface that typically occur more infrequently. As shown in FIG. 3, the angle of the cusp is a function of dimension, e.g., a diameter, of the tool and the step over distance. For example, in one embodiment, the step over distance is selected based on the diameter of the tool and desired smoothness of the surface, i.e., a height of the cusp. Hence, a desired angle of the cusp is known in advance of a machining process.

The machining process includes, but not limited to, turning, milling, and drilling operations. Depending on an operation, the machining process further includes selecting a machining tool, e.g., a type of the tool such as a single point tool or a multiple-cutting-edge tool, shape, materials, and dimensions of the tools, determining directions of the motion of the tools, the step over distance of the tools, and determining machining instructions for the operation. In turn, the machining instructions include an order of operations and a path for the tool.

The machining process controls the desired accuracy of the surface. For example, the step over distance for roughing cuts can be greater than the step over distance for finishing cuts. However, a value of the step over distance is just a one example of controlling the smoothness of the surface by the machining process. Accordingly, several embodiments of the invention determine the minimal and/or the maximal threshold based on the machining process that generates the surface of the object. Similarly, some embodiments determine the thresholds based on the simulation of the machining process that generates the surface of the model of the object.

For example, one embodiment determines the minimal threshold based on a value of the desired angle of the cusp. One variation of this embodiment determines the minimal threshold by increasing the value of the desired angle of the cusp by a margin dependent on a magnitude of tolerable variations in the angle of the cusp.

Additionally and alternatively the minimal threshold can be determined based on a fact that the defects of the surface are relatively infrequent. For example, one embodiment determines a histogram of a number of pixels versus the rate of change of normal vectors, described below, and selects the minimal threshold such that the majority of pixels have the rate of change less than the threshold.

Figure 7:
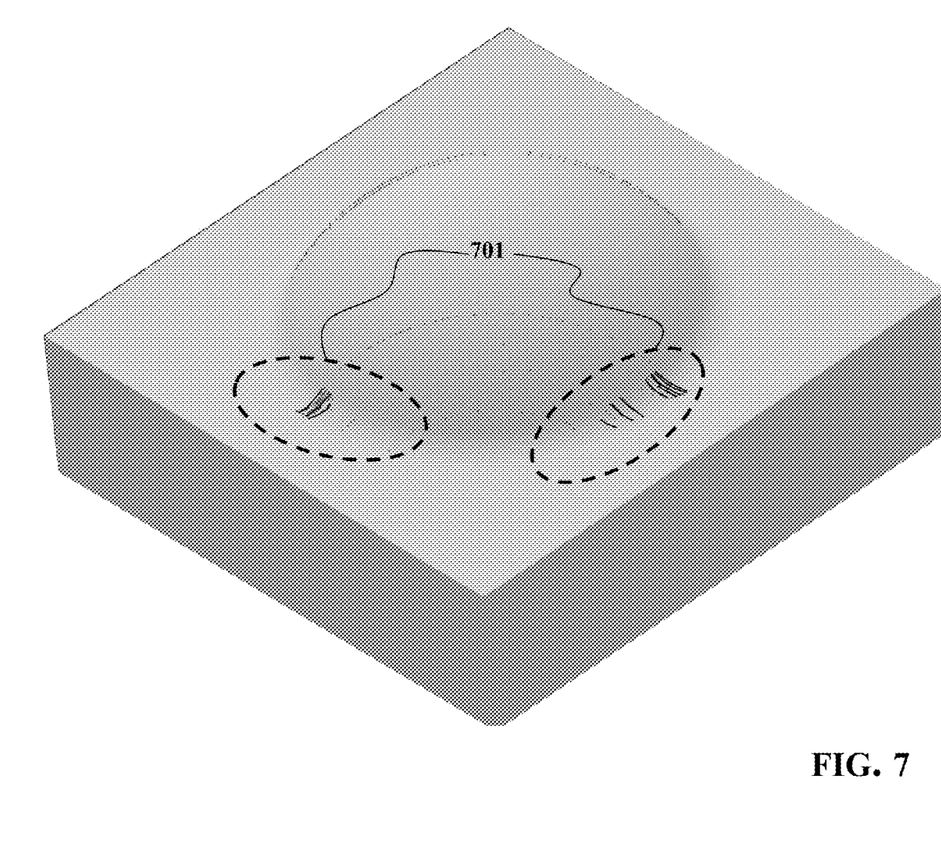
FIG. 7 is an isometric view of an example of a model of the object with highlighted portions of the surface with defects.

Output 455 of the method is processed by an output module 450. For example, the output module stores indentified portions of the surface with defects in a memory (not shown). Additionally or alternatively, the output module displays the model of the object on a display device highlighting the portions 701 of the surface with defects, as shown in FIG. 7.

Normal Vectors

Some embodiments of the invention determine the orientations of the surface based on normal vectors. As referred herein, a normal vector at a pixel has a length equal one and is perpendicular to the surface at a location corresponding to the pixel. For example, referring to the FIG. 2, a vector 209 is the normal vector associated with the cut 203 adjacent to the cusp 208, and a vector 210 is the normal vector associated with the cut 204 adjacent to the cusp 208. The cusp angle is then determined by computing the vector dot product of the normal vectors of the surfaces on each edge of the cusp. The dot product is a cosine of the cusp angle.

On-Line Processing

Figure 5:
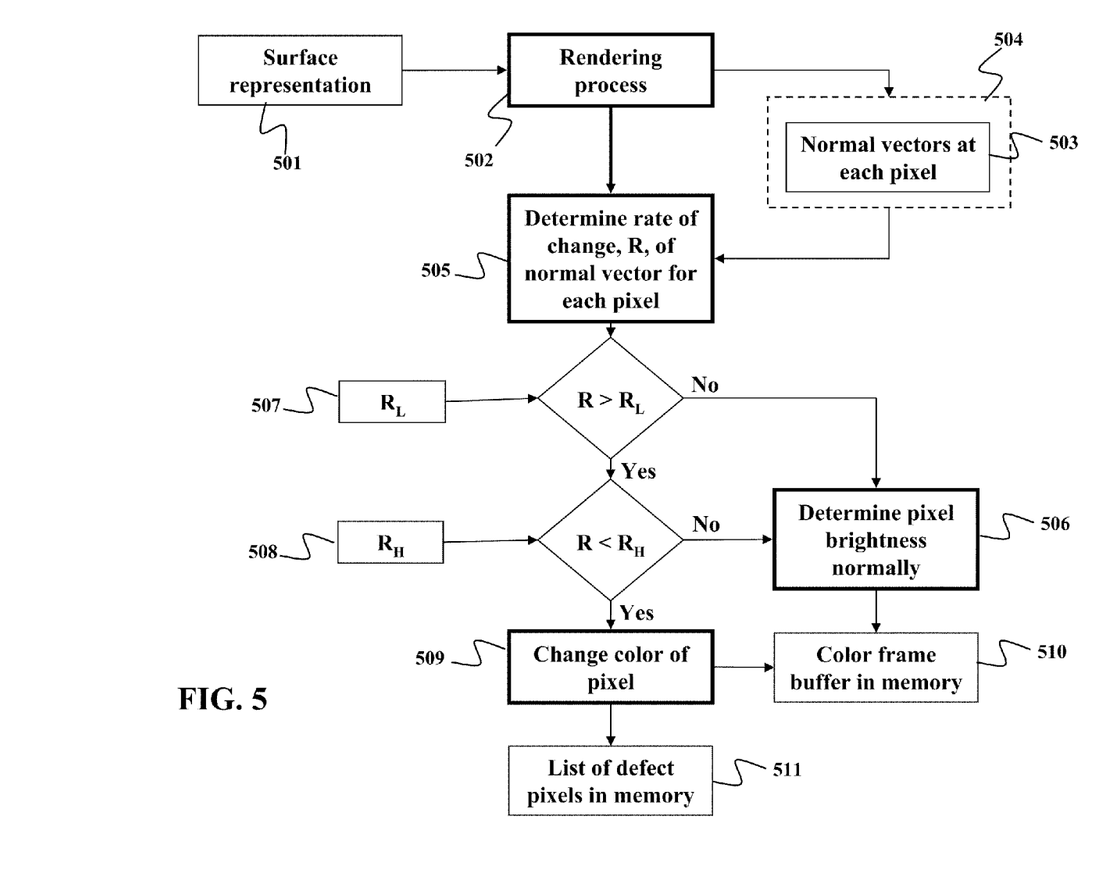
FIG. 5 is a block diagram of a method for highlighting defects of the surface while rendering the surface of the object according an embodiment of the invention.

FIG. 5 shows a method for highlighting defects of the surface of the model of the object while rendering the surface of the object. The rendering 502 of the simulated surface of the object depends in the underlying representation of the surface 501. For example, the surface may be represented by Boolean difference between distance fields that represent an original surface and distance fields that represent the volume swept by the machining tool during the cutting.

In one embodiment, the surface is rendered by a conventional ray casting method where mathematical rays associated with each pixel are projected onto the simulated surface from the viewing direction. The color and brightness of each ray that intersects the surface is determined by the surface color and the normal vector at a point of intersection.

Another representation of the surface 501 is a mesh of geometric primitives such as triangles. In one embodiment, the triangle mesh is rendered using a graphics application programming interface (API) such as OpenGL. Usually the color and the normal vector are defined at each vertex of a triangle interpolated by the graphics implementation across the pixels spanned by the triangle according to viewing conditions.

The normal vectors are used to compute the brightness of the pixel as though the surface was lit by a light located at a position above the surface. As an example, one conventional computer lighting technique determines the brightness of the pixel as a sum of an ambient component independent of the normal vectors, a diffuse component proportional to the vector dot product between the normal vector and a vector from the surface to the light position, and a specular component proportional to the dot product between the surface normal vector and a vector halfway between the viewing direction and the light direction, raised to a power determined by the shininess of the surface.

In conventional rendering, the normal vector for each pixel in the image of the surface is used to compute the brightness of the pixel, and then discarded. The resultant pixel values are stored in a memory called a color framebuffer, and ultimately are displayed, stored or transmitted.

However, one embodiment of the invention, instead of discarding the normal vectors determined to compute the brightness of the pixels, reuses the normal vectors for indentifying and/or highlighting the defects of the surface. In this embodiment, instead of immediately computing the pixel brightness using the normal vectors, the normal vectors 503 for every pixel in the image of the surface are stored into a normal framebuffer 504. After all of the normal vectors have been stored, the normal vectors are processed to indentify and/or highlight defects.

In one embodiment, the rates of change 446 of the normal vectors are determined based on central differences between the normal vectors. Specifically, the rate of change in the orientation of the surface at a pixel is determined as the difference between the normal vector at the pixel and the normal vectors at neighbor pixels, e.g., the normal vectors at pixels adjacent to the pixel.

Figure 6:
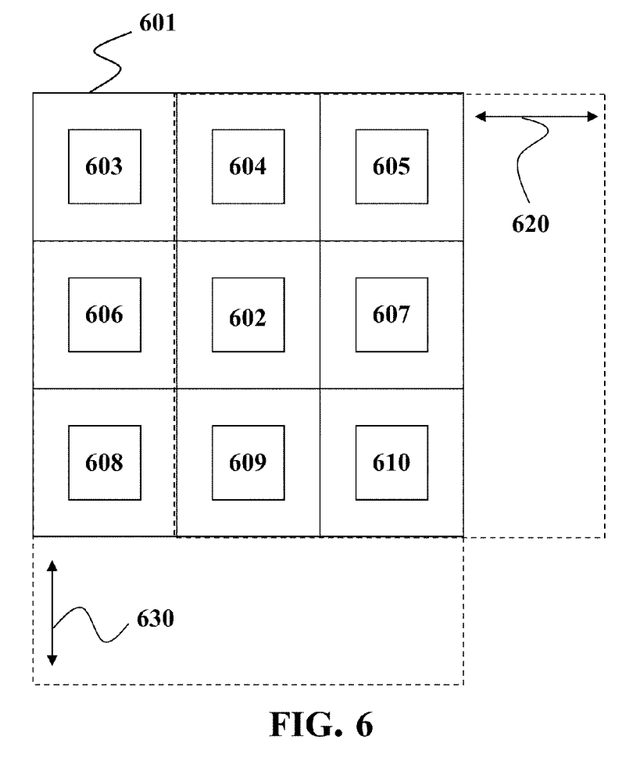
FIG. 6 is a block diagram of an example of determining a rate of change of orientations of the surface according an embodiment of the invention.

FIG. 6 shows an example of determining the rate of change of the orientation of the surface at a pixel 602, e.g., a central pixel 602 in a window 601, based on the central difference between the normal vector at the pixel 602 and the normal vectors at the adjacent pixels 602-610. The window 601 moves vertically 620 and/or horizontally 630 over all pixels of the model of the surface to determine the rate of change for each pixel.

The window 601 covers a 3×3 grid of normal vectors selected from the normal framebuffer. As defined herein, the normal vector at pixel 602 is $$N_0 = (N_{0x}, N_{0y}, N_{0z}),$$

and the normal vectors of the eight nearest neighbor pixels 603-610 is $$N_i = (N_{ix}, N_{iy}, N_{iz}),$$

wherein i is an index of the normal vectors in the window ranging, e.g., from 1 to 8, and x, y, and z identify three dimensional (3D) components of the normal vectors along the axes x, y, and z. Then the rate of change $R_0$ of the normal vector components at pixel location 602 is determined by $$R_{0j} = \left(\sum_{i=1}^{8} N_{ij}\right) - 8N_{0j},$$

where j indicates the component of the vector, i.e., x, y, or z. The rate of change of the normal vector is, e.g., a square root of the sum of the squares of components $R_{0j}$.

Various embodiments of the invention use different thresholds to identify defects of the surface. The regions of the surface with the rate of change values below the minimal threshold 507 correspond to a smooth surface and/or to a surface with cusps between non-defective cuts. The regions of the surface with the rate of change values above the maximal threshold 508 correspond to edges of the object and/or to deep cuts associated with non-freeform regions of the surface. Therefore, in one embodiment, only pixels corresponding to values of the rate of change in a defect range, i.e., between the minimal and the maximal thresholds, are identified as possible defect regions of the surface.

For example, one embodiment changes 509 colors of pixels, e.g., in a red color, corresponding to values of the rate of change in the defect range, while colors of other pixels are computed normally 506 using the values stored in the normal framebuffer. Another embodiment sets the color of pixels based on the rate of change using a look-up table. For example, pixels with rate of change below the minimal threshold are colored blue, pixels with the rate of change within the defective range are colored red, and pixels with rate of change above the maximal threshold are colored green. However, skilled artisan would readily recognize that many other methods and/or look-up tables can be applied to enhance visual identification of the defects. After the pixels corresponding to the regions with the rate of change within the defect range are determined, the pixels are stored in the memory 511 and the colors of those pixels are stored in the color framebuffer 510.

Off-Line Processing

Some embodiments identify defects of the surface in a process separate from the process of rendering and/or determining the brightness of the pixels. Those embodiments account for a fact that in some applications the density of pixels is insufficient to detect small defects unless the surface is enlarged during the rendering. Similarly, the insufficient density of the pixels can cause defects to be missed because of insufficient sampling of the surface.

Additionally and/or alternatively, some defects of the surface are not visible from the direction of view in the rendered model. On one embodiment, this limitation is overcome by observing the simulated surface over a wide range of angles at a close scale.

However, another embodiment identifies the defects of the surface after the simulation is complete and independent of the viewing of the simulation results. The embodiment renders portions of the surface into an off-screen normal buffer at a high resolution sufficient to guarantee the defects larger than a minimal size can be identified. Additionally and/or alternatively, the embodiment examines the simulated surface from a range of points of view, e.g. along each of the +x, −x, +y, −y, +z, and −z axis. Alternatively, one embodiment renders a portion of the surface coarsely to determine a dominant orientation of that portion of the surface, and renders the surface from the dominant orientation.

In some embodiments, not all pixels with the rate of change of the orientation of the surface between the minimal and the maximal thresholds correspond to the defects of the surface. Some pixels can correspond to defects in the rendering process, such that the surface normal for a pixel is incorrectly determined. Therefore, one embodiment of the invention initially renders a portion of the surface coarsely and performs low resolution defect detection. The regions of the surface where defects are identified at low resolution are then locally re-rendered at high resolution to improve the detection of the defects identified by a line of pixels along edge of the machining cut.

Also, one embodiment uses the normal framebuffer to hold information about the high resolution rendering of the surface. Alternative embodiments, partition the surface into overlapping or adjacent patches to reduce memory requirements without compromising the quality of defect identification.

In another embodiment generates a list of possible defect areas on the simulated surface, and outputs this list to the user. For example, the list can be presented as rectangular boxes superimposed on the low resolution image and enclosing the possible defect regions. The user can then view these regions more closely to make a final determination as to the existence of an actual defect. Additionally or alternatively, the defect list is presented in a text format describing location and character of the possible defect. It is advantageous to use a user interface such that the user can selects an entry in the defect list to have the simulated image reorient, center and zoom into the defect region.

Figure 8:
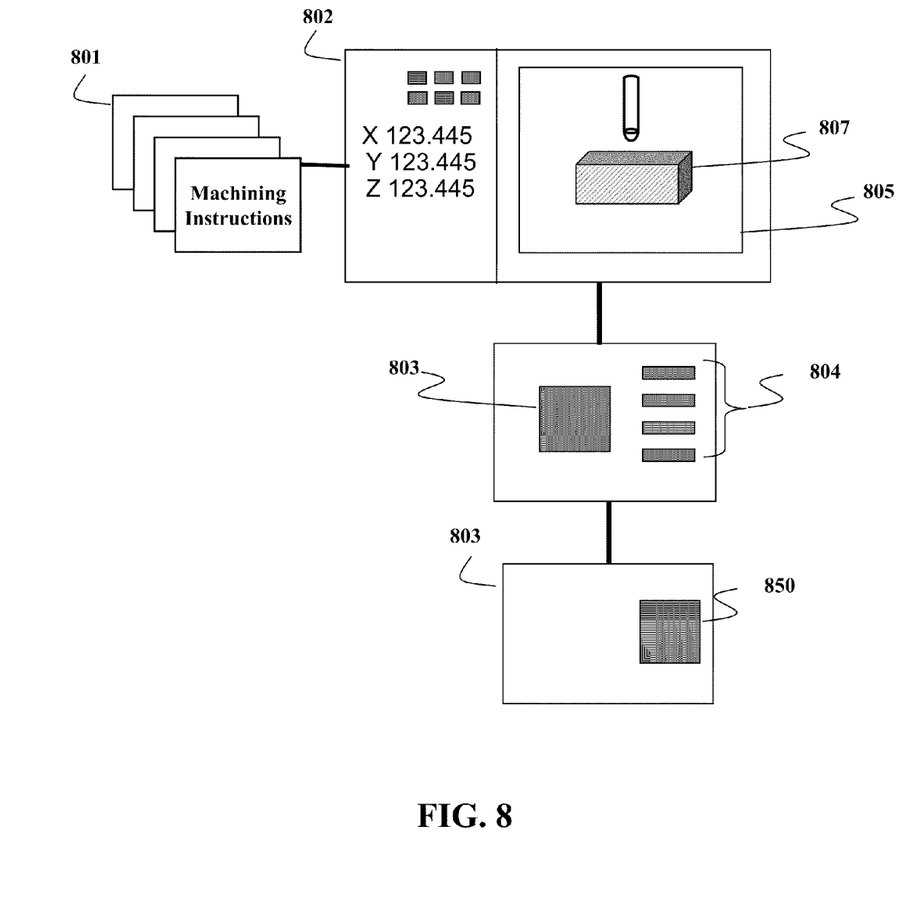
FIG. 8 is a block diagram of an example of an embodiment of the invention.

FIG. 8 shows an example of another embodiment of the invention. A set of machining instructions 801 is provided to an NC machining controller 802 either as a file over a network, from a CD or DVD, or by other means known in the art. The controller 802 includes of a processor 803, memory 804 and a display 805 for showing the operation of the machine. The processor perform a machining simulation and executes a method according to embodiments of the invention, e.g., the method 400, to produce an image 507 identifying the defects of the machining simulation on the display 505.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a defect of a surface of an object due to a machining process applied to the object, wherein the surface is generated from a model of the object by a simulation of the machining process, comprising the steps of:

determining, at each pixel of the model of the surface, an orientation of the surface;

determining, for each pixel, a rate of change in the orientation of the surface based on a difference between a normal vector at the pixel and normal vectors at neighboring pixels;

comparing the rate of change to at least one threshold to identify the defects of the surface, wherein the threshold is determined based on the machining process, and wherein the steps of the method are performed by a processor; and determining the normal vector $N_0$ according to $$N_0 = (N_{0x}, N_{0y}, N_{0z}),$$

wherein $N_{0x}$, $N_{0y}$, $N_{0z}$ are components of the normal vector along axes x, y, and z;

determining the normal vectors $N_i$ according to $$N_i = (N_{ix}, N_{iy}, N_{iz}),$$

wherein i is an index of the normal vectors;

determining components $R_{oj}$ of the rate of change, wherein j is x, y, or z according to $$R_{0j} = \left(\sum_{i=1}^{8} N_{ij}\right) - 8N_{0j}; \text{ and}$$

determining the rate of change based on the components of the rate of change.

2. The method of claim 1, further comprising:
determining the orientation of the surface based on a normal vector at each pixel.

3. The method of claim 1, wherein the neighboring pixels are immediately adjacent to the pixel.

4. The method of claim 1, further comprising:
determining the rate of change as a square root of a sum of squares of the components $R_{0j}$.

5. The method of claim 1, wherein the comparing further comprises:
comparing the rate of change with a minimal threshold, wherein the pixels corresponding to the rate of change with value above the minimal threshold are identified.

6. The method of claim 1, wherein the comparing further comprises:
determining the minimal threshold based on a value of an angle of a cusp, wherein the cusp is formed by cuts of a machining tool during the simulation of the machining process.

7. The method of claim 1, wherein the comparing further comprises:
comparing the rate of change with a minimal threshold; and
comparing the rate of change with a maximal threshold, wherein the pixels corresponding to the rate of change with value above the minimal threshold and below the maximal threshold are identified.

8. The method of claim 1, further comprising:
rendering the surface of the model of the object at a low resolution;
determining regions of the surface identified by the defects; and
rendering the regions of the surface at a high resolution to determine the defects of the surface in the regions identified by a line of pixels along an edge of a machining cut.

9. The method of claim 1, wherein the object is formed by cuts of a milling cutter.

10. The method of claim 1, further comprising:
determining a normal vector at each pixel of the surface; and
storing the normal vector in a normal framebuffer.

11. The method of claim 1, further comprising:
highlighting pixels corresponding to the defects.

12. The method of claim 1, further comprising:
modifying a color of each pixel corresponding to the defects; and
rendering the model of the object on a display.

13. A method for determining a defect of a surface of an object due to a machining process applied to the object, wherein the surface is generated from a model of the object by a simulation of the machining process, comprising the steps of:

determining normal vectors at each pixel of the surface;
determining, for each pixel of the surface, a rate of change in an orientation of the surface based on differences between a normal vector at a pixel and normal vectors at neighboring pixels, wherein defect of the surface is identified by a value of the rate of change, comprising:
determining the normal vector $N_0$ according to
$N_0 = (N_{0x}, N_{0y}, N_{0z})$, wherein $N_{0x}$, $N_{0y}$, $N_{0z}$ are components of the normal vector along axes x, y, and z;
determining the normal vectors $N_i$ according to
$N_i = (N_{ix}, N_{iy}, N_{iz})$, wherein i is an index of the normal vectors;
determining components $R_{oj}$ of the rate of change, wherein j is x, y, or z according to $$R_{0j} = \left(\sum_{i=1}^{8} N_{ij}\right) - 8N_{0j};$$

and
determining the rate of change based on the components of the rate of change; and
highlighting the defect on a display.

14. The method of claim 13, further comprising:
determining a minimal threshold based on the machining process, wherein the machining process includes at least of a turning, a milling, and a drilling operation.

15. The method of claim 13, further comprising:
comparing the rate of change with a minimal threshold; and
comparing the rate of change with a maximal threshold, wherein the pixels corresponding to the rate of change with value above the minimal threshold and below the maximal threshold are identified as the pixels corresponding to the defect of the surface.

16. A system for determining a defect of a surface of a model of an object due to a machining process applied to the object, comprising:
means for generating the surface by a simulation of the machining process;
means for determining, at each pixel of the model of the surface, an orientation of the surface based on a normal vector at a pixel;
means for determining, for each pixel, a rate of change in the orientations of the surface based on a difference between the normal vector at the pixel and normal vectors at neighboring pixels, comprising:
determining the normal vector $N_0$ according to
$N_0 = (N_{0x}, N_{0y}, N_{0z})$, wherein $N_{0x}$, $N_{0y}$, $N_{0z}$ are components of the normal vector along axes x, y, and z;

determining the normal vectors $N_i$ according to $N_i = (N_{ix}, N_{iy}, N_{iz})$, wherein i is an index of the normal vectors;

determining components $R_{oj}$ of the rate of change, wherein j is x, y, or z according to $$R_{0j} = \left(\sum_{i=1}^{8} N_{ij}\right) - 8N_{0j};$$

and determining the rate of change based on the components of the rate of change; and means for comparing the rate of change to at least one threshold to identify the defects of the surface, wherein the threshold is determined based on the machining process.

17. The system of claim 16, further comprising:

means for highlighting the pixels corresponding to the defects.

* * * * *